United States Patent [19]

Belsan

[11] Patent Number: 5,394,532
[45] Date of Patent: Feb. 28, 1995

[54] DISK DRIVE ARRAY MEMORY SYSTEM HAVING INSTANT FORMAT CAPABILITY

[75] Inventor: Jay S. Belsan, Nederland, Colo.

[73] Assignee: Storage Technology Corporation, Louisville, Colo.

[21] Appl. No.: 869,251

[22] Filed: Apr. 15, 1992

[51] Int. Cl.6 ............................................. G06F 12/06
[52] U.S. Cl. .............................. 395/425; 364/DIG. 1; 364/243.2
[58] Field of Search ... 364/200 MS File, 900 MS File; 395/400, 425

[56] References Cited

U.S. PATENT DOCUMENTS

| | | | |
|---|---|---|---|
| 5,155,845 | 10/1992 | Beal et al. | 395/575 |
| 5,193,184 | 3/1994 | Belsan et al. | 395/600 |
| 5,210,866 | 5/1993 | Milligan et al. | 395/575 |
| 5,239,659 | 8/1993 | Rudeseal et al. | 395/800 |

Primary Examiner—Joseph L. Dixon
Assistant Examiner—Hiep T. Nguyen
Attorney, Agent, or Firm—Duft, Graziano & Forest

[57] ABSTRACT

The disk drive array data storage subsystem maps between virtual and physical data storage devices and schedules the writing of data to these devices. The data storage subsystem functions as a conventional large form factor disk drive memory, using a plurality of redundancy groups, each containing N+M disk drives. A performance improvement is obtained by eliminating the disk formatting delays found in the prior art. In order to accommodate the need to format virtual volumes to be compatible with the form and format of the data records to be transmitted by the host processor, the present disk drive array memory system stores format information in a virtual track directory which controls the mapping of the virtual cylinders defined by the host processor into the physical elements of the disk drive array. Therefore, not only the cylinders are mapped from virtual to physical but the format of these cylinders is also mapped from the virtual format defined by the host processor to the physical configuration used by the disk drive array memory. The disk drive array memory system does not physically format the cylinders and tracks of the disk drives contained therein in response to a format command from the host processor but simply emulates this operation by writing the format data into the virtual track directory.

20 Claims, 8 Drawing Sheets

| CHANNEL COMMAND WORD | OP CODE | PARAMETERS | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| DEFINE EXTENT (1301) | 63 | 98 | E4 | 00 | 00 | 00 | 00 | 00 | XX | XX | XX | XX | YY | YY | YY | YY |
| LOCATE RECORD (1302) | 47 | 01 | 00 | 00 | 01 | 22 | 22 | 22 | 22 | C5 | C3 | C1 | D4 | 02 | 00 | FF |
| WRITE DATA (1303) | 05 | | | | | | | | | | | | | | | |
| READ COUNT KEY DATA (1304) | 1E | IDENTIFY BEGINNING AND ENDING CCHH AND SEEK ADDRESS | | | | | | | | | | | | | | |

1311 → (DEFINE EXTENT params)
1312 → (LOCATE RECORD params)
1313 → (WRITE DATA params)
1314 → (READ COUNT KEY DATA params)

FIG. 8.

DISK DRIVE ARRAY MEMORY SYSTEM HAVING INSTANT FORMAT CAPABILITY

FIELD OF THE INVENTION

This invention relates to disk drive array memory systems and, in particular, to a method and apparatus for instantly formatting the disk drives of the disk drive array.

PROBLEM

It is a problem in conventional count-key-data disk drive memory systems and also in disk drive array memory systems, to format the disk drives to accommodate the data that is transmitted by the host processor. Disk drive array memory systems generally comprise a plurality of disk drive elements, each of which is connected to an associated controller by a common bus that serves a plurality of disk drive elements. The controller is connected by way of a data channel to at least one host processor. The host processors transmit channel commands to the controller to control the reading and writing of data onto the plurality of disk drive elements. The controller, upon receipt of a channel command from an associated host processor, manages the transfer of data between the host processor and a selected one of the disk drive elements.

A significant performance impediment in this configuration is the format operation, wherein the host processor transmits data records of predetermined format to the controller for storage on the associated disk drive elements. In order to maximize the efficiency of this transfer, the host processor formats the selected disk drive element to be compatible with the data records that will subsequently be stored thereon. In particular, the host processor defines a block size, blocks per track and other relevant information indicative of the extent of the data records that the host processor intends to store on the selected disk drive element. The controller, or in some cases the host processor itself, communicates with the selected disk drive element via the common bus to write the disk format onto the physical media of the selected disk drive element. Typically, one or more cylinders of the disk drive element must be written with the format information so that the resultant physical configuration of the selected disk drive element is compatible with the extent of the data records transmitted by the host processor. Therefore, a significant amount of time and resources (host processor and channel) are expended to format every cylinder on every disk drive element in a disk drive array memory. Furthermore, when the host processor requests that a one or more tracks be reformatted, this operation must take place before the host processor can transmit the data record to the controller for storage on the selected disk drive element. This represents a performance bottleneck in that the host processor must delay writing the data records to the selected disk drive element until the formatting operation is completed. The presently used conventional count-key-data disk drives therefore require hundreds of channel commands to format the disk drive on a track-by-track basis, and the best case time is one revolution of the disk per track being formatted, for normal CKD disks.

SOLUTION

The above described problems are solved and a technical advance achieved in the field by the disk drive array memory system of the present invention which makes use of an instant format capability to eliminate the formatting delays found in the prior art. The dynamic mapping of the disk drive array memory of the present invention isolates the host processor from knowledge of and control over the storage of data on the physical media of the plurality of disk drives contained within the disk drive array. In order to accommodate the need to format virtual disk drives, whose native format may be count-key-data architecture, to be compatible with the form and format of the data records to be transmitted by the host processor, the present disk drive array memory system stores format information transmitted by the host processor in a virtual track directory which controls the mapping of the virtual cylinders defined by the host processor into the physical elements of the disk drive array. Therefore, not only the cylinders are mapped from virtual to physical but the format of these cylinders is also mapped from the virtual format defined by the host processor to the physical configuration used by the disk drive array memory. The disk drive array memory system does not physically format the cylinders and tracks of the disk drives contained therein in response to a format command from the host processor but simply emulates this operation by writing the format data into the virtual track directory.

Thus, upon receipt of a host processor command to format a virtual cylinder contained within the disk drive array memory system, the controller of the disk drive array memory system stores the format information in the virtual track directory. The data records subsequently received from the host processor are written into cache memory and later stored on the tracks of a selected subsystem disk drive within the disk drive array in a form and native format that is compatible with the physical disk drives that are used to implement the disk drive array memory and the virtual format information is written on the selected disk drive to accompany the data records. When the host processor requests that the data record be transmitted from the disk drive array to the host processor, the controller within the disk drive array memory system retrieves the data records along with the virtual format information from the selected disk drive. As the controller transmits the retrieved data record from the cache memory to the host processor, it formats this retrieved data record on a dynamic basis into the format originally defined by the host processor. Therefore, the disk drive array memory system appears to the host processor to physically format the virtual disk drives contained therein and to store the data records transmitted by the host processor in this formatted data space. The actual operation of the disk drive array memory is transparent to the host processor and faster than the prior art memory systems.

BRIEF DESCRIPTION OF THE DRAWING

FIG. 8 illustrates the format of commands used to perform a disk format operation.

DETAILED DESCRIPTION OF THE DRAWING

Figure 1:
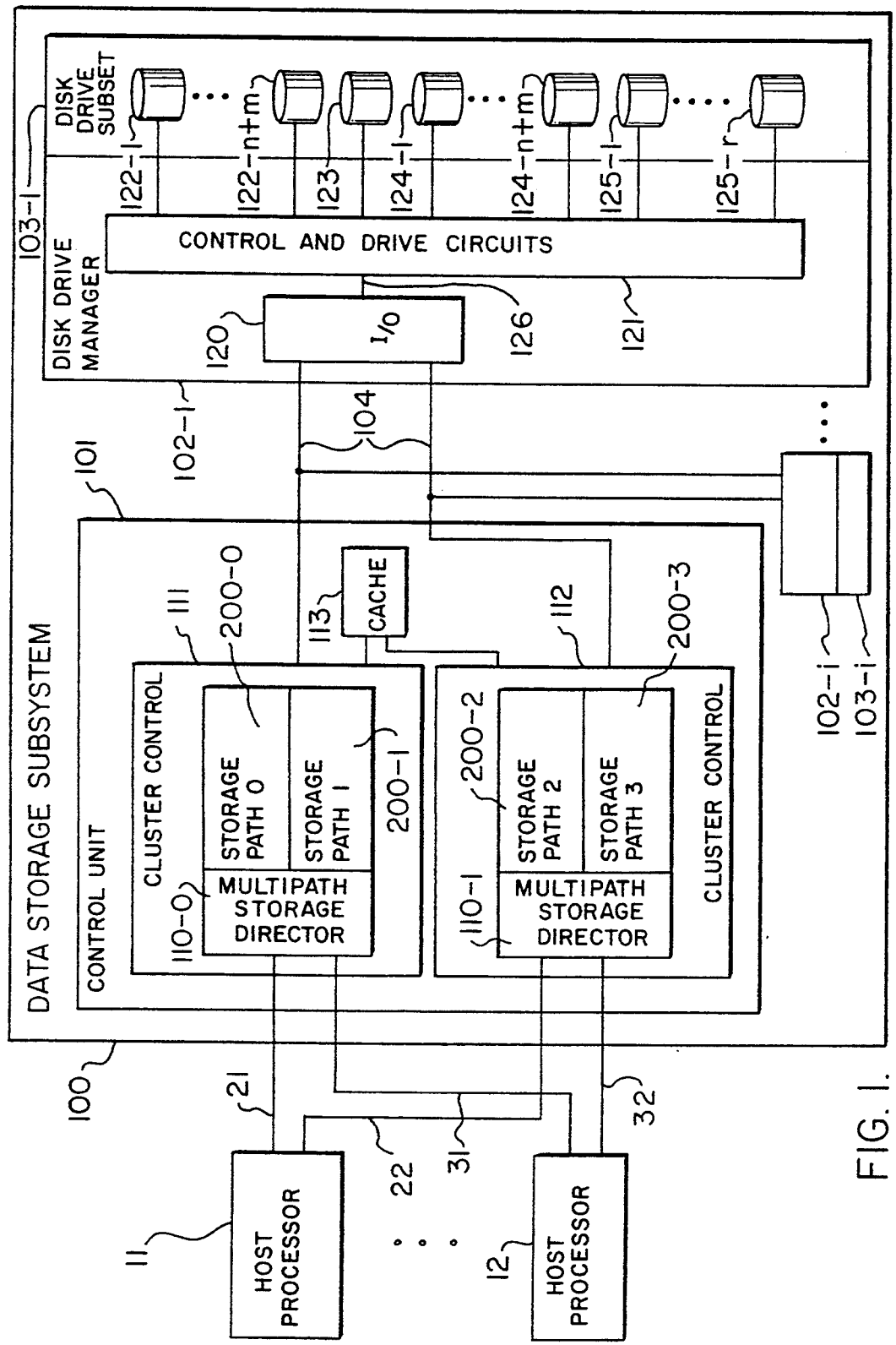
FIG. 1 illustrates in block diagram form the architecture of the disk drive array data storage subsystem.

The data storage subsystem of the present invention uses a plurality of small form factor disk drives in place of a single large form factor disk drive to implement an inexpensive, high performance, high reliability disk drive array memory that emulates the format and capability of large form factor disk drives. The plurality of disk drives in the disk drive array data storage subsystem are configured into a plurality of variable size redundancy groups of N+M connected disk drives to store data thereon. Each redundancy group, also called a logical disk drive, is divided into a number of logical cylinders, each containing i logical tracks, one logical track for each of the i physical tracks contained in a cylinder of one physical disk drive. Each logical track is comprised of N+M physical tracks, one physical track from each disk drive in the redundancy group. The N+M disk drives are used to store N data segments, one on each of N physical tracks per logical track, and to store M redundancy segments, one on each of M physical tracks per logical track in the redundancy group. The N+M disk drives in a redundancy group have unsynchronized spindles and loosely coupled actuators. The data is transferred to the disk drives via independent reads and writes since all disk drives operate independently. In addition, a pool of R globally switchable backup disk drives is maintained in the data storage subsystem to automatically substitute a replacement disk drive for a disk drive in any redundancy group that fails during operation. The pool of R backup disk drives provides high reliability at low cost.

The disk drive array data storage subsystem includes a data storage management system that provides improved data storage and retrieval performance by dynamically mapping between virtual and physical data storage devices. The disk drive array data storage subsystem consists of three abstract layers: virtual, logical and physical. The virtual layer functions as a conventional large form factor disk drive memory. The logical layer functions as an array of storage units that are grouped into a plurality of redundancy groups, each containing N+M physical disk drives. The physical layer functions as a plurality of individual small form factor disk drives. The data storage management system operates to effectuate the dynamic mapping of data among these abstract layers and to control the allocation and management of the actual space on the physical devices. These data storage management functions are performed in a manner that renders the operation of the disk drive array data storage subsystem transparent to the host processor which perceives only the virtual image of the disk drive array data storage subsystem.

The performance of this system is enhanced by the use of a cache memory with both volatile and non-volatile portions and "backend" data staging and destaging processes. No data stored in a redundancy group is modified. A virtual track is staged from a redundancy group into cache. The host then modifies some, perhaps all, of the records on the virtual track. Then, as determined by cache replacement algorithms such as Least Recently Used, etc, the modified virtual track is selected to be destaged to a redundancy group. When thus selected, a virtual track is divided (marked off) into several physical sectors to be stored on one or more physical tracks of one or more logical tracks. A complete physical track may contain physical sectors from one or more virtual tracks. Each physical track is combined with N−1 other physical tracks to form the N data segments of a logical track.

The original, unmodified data is simply flagged as obsolete. Obviously, as data is modified, the redundancy groups increasingly contain numerous virtual tracks of obsolete data. The remaining valid virtual tracks in a logical cylinder are read to the cache memory in a background "free space collection" process. They are then written to a previously emptied logical cylinder and the "collected" logical cylinder is tagged as being empty. Thus, all redundancy data creation, writing and free space collection occurs in background, rather than on-demand processes. This arrangement avoids the parity update problem of existing disk array systems and improves the response time versus access rate performance of the data storage subsystem by transferring these overhead tasks to background processes.

Data Storage Subsystem Architecture

FIG. 1 illustrates in block diagram form the architecture of the preferred embodiment of the disk drive array data storage subsystem 100. The disk drive array data storage subsystem 100 appears to the associated host processors 11-12 to be a collection of large form factor disk drives with their associated storage control, since the architecture of disk drive array data storage subsystem 100 is transparent to the associated host processors 11-12. This disk drive array data storage subsystem 100 includes a plurality of disk drives (ex 122-1 to 125-r) located in a plurality of disk drive subsets 103-1 to 103-i. The disk drives 122-1 to 125-r are significantly less expensive, even while providing disk drives to store redundancy information and providing disk drives for backup purposes, than the typical 14 inch form factor disk drive with an associated backup disk drive. The plurality of disk drives 122-1 to 125-r are typically the commodity hard disk drives in the 5¼inch form factor.

The architecture illustrated in FIG. 1 is that of a plurality of host processors 11-12 interconnected via the respective plurality of data channels 21, 22-31, 32, respectively to a data storage subsystem 100 that provides the backend data storage capacity for the host processors 11-12. This basic configuration is well known in the data processing art. The data storage subsystem 100 includes a control unit 101 that serves to interconnect the subsets of disk drives 103-1 to 103-i and their associated drive managers 102-1 to 102-i with the data channels 21-22, 31-32 that interconnect data storage subsystem 100 with the plurality of host processors 11, 12.

Control unit 101 includes typically two cluster controls 111, 112 for redundancy purposes. Within a cluster control 111 the multipath storage director 110-0 provides a hardware interface to interconnect data channels 21, 31 to cluster control 111 contained in control unit 101. In this respect, the multipath storage director 110-0 provides a hardware interface to the associated data channels 21, 31 and provides a multiplex function to enable any attached data channel (such as 21) from any host processor such as 11) to interconnect to a selected cluster control 111 within control unit 101. The cluster control 111 itself provides a pair of storage paths 201-0, 201-1 which function as an interface to a plurality of optical fiber backend channels 104. In addition, the cluster control 111 includes a data compression function as well as a data routing function that enables cluster control 111 to direct the transfer of data between a selected data channel 21 and cache memory 113, and between cache memory 113 and one of the connected optical fiber backend channels 104. Control unit 101 provides the major data storage subsystem control functions that include the creation and regulation of data redundancy groups, reconstruction of data for a failed disk drive, switching a spare disk drive in place of a failed disk drive, data redundancy generation, logical device space management, and virtual to logical device mapping. These subsystem functions are discussed in further detail below.

Disk drive manager 102-1 interconnects the plurality of commodity disk drives 122-1 to 125-r included in disk drive subset 103-1 with the plurality of optical fiber backend channels 104. Disk drive manager 102-1 includes an input/output circuit 120 that provides a hardware interface to interconnect the optical fiber backend channels 104 with the data paths 126 that serve control and drive circuits 121. Control and drive circuits 121 receive the data on conductors 126 from input/output circuit 120 and convert the form and format of these signals as required by the associated commodity disk drives in disk drive subset 103-1. In addition, control and drive circuits 121 provide a control signalling interface to transfer signals between the disk drive subset 103-1 and control unit 101. The data that is written onto the disk drives in disk drive subset 103-1 consists of data that is transmitted from an associated host processor 11 over data channel 21 to one of cluster controls 111, 112 in control unit 101. The data is written into, for example, cluster control 111 which stores the data in cache 113. Cluster control 111 stores N physical tracks of data in cache 113 and then generates M redundancy segments for error correction purposes. Cluster control 111 then selects a subset of disk drives (122-1 to 122-n+m) to form a redundancy group to store the received data. Cluster control 111 selects an empty logical track, consisting of N+M physical tracks, in the selected redundancy group. Each of the N physical tracks of the data are written onto one of N disk drives in the selected data redundancy group. An additional M disk drives are used in the redundancy group to store the M redundancy segments. The M redundancy segments include error correction characters and data that can be used to verify the integrity of the N physical tracks that are stored on the N disk drives as well as to reconstruct one or more of the N physical tracks of the data if that physical track were lost due to a failure of the disk drive on which that physical track is stored.

Thus, data storage subsystem 100 can emulate one or more large form factor disk drives (such as an IBM 3390-3 type of disk drive) using a plurality of smaller form factor disk drives while providing a high reliability capability by writing the data across a plurality of the smaller form factor disk drives. A reliability improvement is also obtained by providing a pool of R backup disk drives (125-1 to 125-r) that are switchably interconnectable in place of a failed disk drive. Data reconstruction is accomplished by the use of the M redundancy segments, so that the data stored on the remaining functioning disk drives combined with the redundancy information stored in the redundancy segments can be used by control software in control unit 101 to reconstruct the data lost when one or more of the plurality of disk drives in the redundancy group fails (122-1 to 122-n+m). This arrangement provides a reliability capability similar to that obtained by disk shadowing arrangements at a significantly reduced cost over such an arrangement.

Control Unit

Figure 2:
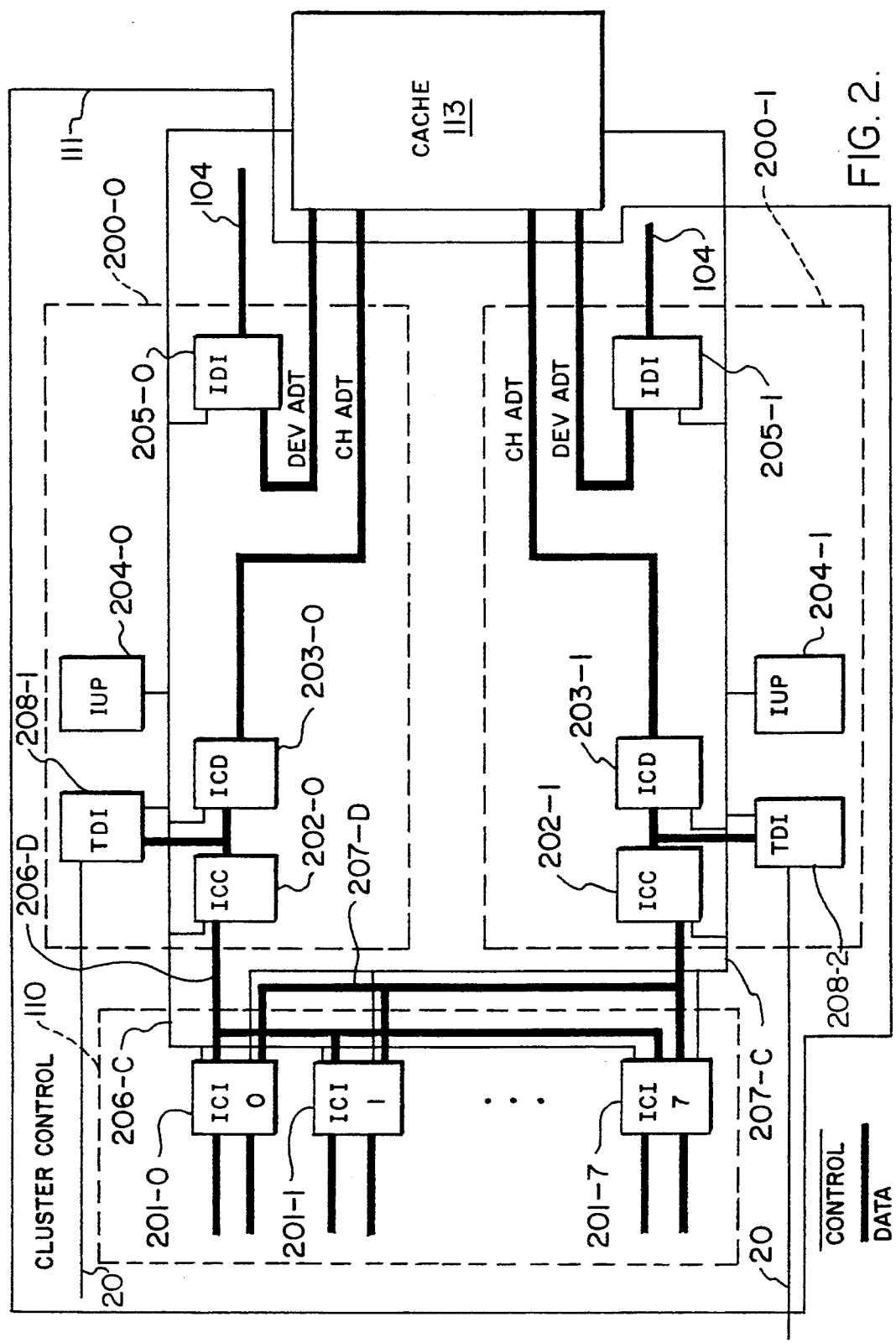
FIG. 2 illustrates the cluster control of the data storage subsystem.

FIG. 2 illustrates in block diagram form additional details of cluster control 111. Multipath storage director 110 includes a plurality of channel interface units 201-0 to 201-7, each of which terminates a corresponding pair of data channels 21, 31. The control and data signals received by the corresponding channel interface unit 201-0 are output on either of the corresponding control and data buses 206-C, 206-D, or 207-C, 207-D, respectively, to either storage path 200-0 or storage path 200-1. Thus, as can be seen from the structure of the cluster control 111 illustrated in FIG. 2, there is a significant amount of symmetry contained therein. Storage path 200-0 is identical to storage path 200-1 and only one of these is described herein. The multipath storage director 110 uses two sets of data and control busses 206-D, C and 207-D, C to interconnect each channel interface unit 201-0 to 201-7 with both storage path 200-0 and 200-1 so that the corresponding data channel 21 from the associated host processor 11 can be switched via either storage path 200-0 or 200-1 to the plurality of optical fiber backend channels 104. Within storage path 200-0 is contained a processor 204-0 that regulates the operation of storage path 200-0. In addition, an optical device interface 205-0 is provided to convert between the optical fiber signalling format of optical fiber backend channels 104 and the metallic conductors contained within storage path 200-0. Channel interface control 202-0 operates under control of processor 204-0 to control the flow of data to and from cache memory 113 and one of the channel interface units 201 that is presently active with storage path 200-0. The channel interface control 202-0 includes a cyclic redundancy check (CRC) generator/checker to generate and check the CRC bytes for the received data. The channel interface circuit 202-0 also includes a buffer that compensates for speed mismatch between the data transmission rate of the data channel 21 and the available data transfer capability of the cache memory 113. The data that is received by the channel interface control circuit 202-0 from a corresponding channel interface circuit 201 is forwarded to the cache memory 113 via channel data compression circuit 203-0. The channel data compression circuit 203-0 provides the necessary hardware and microcode to perform compression of the channel data for the control unit 101 on a data write from the host processor 11. It also performs the necessary decompression operation for control unit 101 on a data read operation by the host processor 11.

As can be seen from the architecture illustrated in FIG. 2, all data transfers between a host processor 11 and a redundancy group in the disk drive subsets 103 are routed through cache memory 113. Control of cache memory 113 is provided in control unit 101 by processor 204-0. The functions provided by processor 204-0 include initialization of the cache directory and other cache data structures, cache directory searching and management, cache space management, cache performance improvement algorithms as well as other cache control functions. In addition, processor 204-0 creates the redundancy groups from the disk drives in disk drive subsets 103 and maintains records of the status of those devices. Processor 204-0 also causes the redundancy data across the N data disks in a redundancy group to be generated within cache memory 113 and writes the M segments of redundancy data onto the M redundancy disks in the redundancy group. The functional software in processor 204-0 also manages the mappings from virtual to logical and from logical to physical devices. The tables that describe this mapping are updated, maintained, backed up and occasionally recovered by this functional software on processor 204-0. The free space collection function is also performed by processor 204-0 as well as management and scheduling of the optical fiber backend channels 104. Many of these above functions are well known in the data processing art and are not described in any detail herein.

Dynamic Virtual Device to Logical Device Mapping

With respect to data transfer operations, all data transfers go through cache memory 113. Therefore, front end or channel transfer operations are completely independent of backend or device transfer operations. In this system, staging operations are similar to staging in other cached disk subsystems but destaging transfers are collected into groups for bulk transfers. In addition, this data storage subsystem 100 simultaneously performs free space collection, mapping table backup, and error recovery as background processes. Because of the complete front end/backend separation, the data storage subsystem 100 is liberated from the exacting processor timing dependencies of previous count key data disk subsystems. The subsystem is free to dedicate its processing resources to increasing performance through more intelligent scheduling and data transfer control.

The disk drive array data storage subsystem 100 consists of three abstract layers: virtual, logical and physical. The virtual layer functions as a conventional large form factor disk drive memory. The logical layer functions as an array of storage units that are grouped into a plurality of redundancy groups (such as 122-1 to 122-n+m), each containing N+M disk drives to store N physical tracks of data and M physical tracks of redundancy information for each logical track. The physical layer functions as a plurality of individual small form factor disk drives. The data storage management system operates to effectuate the mapping of data among these abstract layers and to control the allocation and management of the actual space on the physical devices. These data storage management functions are performed in a manner that renders the operation of the disk drive array data storage subsystem 100 transparent to the host processors (11-12).

A redundancy group consists of N+M disk drives. The redundancy group is also called a logical volume or a logical device. Within each logical device there are a plurality of logical tracks, each of which is the set of all physical tracks in the redundancy group which have the same physical track address. These logical tracks are also organized into logical cylinders, each of which is the collection of all logical tracks within a redundancy group which can be accessed at a common logical actuator position. A disk drive array data storage subsystem 100 appears to the host processor to be a collection of large form factor disk drives, each of which contains a predetermined number of tracks of a predetermined size called a virtual track. Therefore, when the host processor 11 transmits data over the data channel 21 to the data storage subsystem 100, the data is transmitted in the form of the individual records of a virtual track. In order to render the operation of the disk drive array data storage subsystem 100 transparent to the host processor 11, the received data is stored on the actual physical disk drives (122-1 to 122-n+m) in the form of virtual track instances which reflect the capacity of a track on the large form factor disk drive that is emulated by data storage subsystem 100. Although a virtual track instance may spill over from one physical track to the next physical track, a virtual track instance is not permitted to spill over from one logical cylinder to another. This is done in order to simplify the management of the memory space. In addition, virtual track instances are padded out if necessary to fit into an integral number of physical device sectors. This is to insure that each virtual track instance starts on a sector boundary of the physical device.

Mapping Tables

It is necessary to accurately record the location of all data within the disk drive array data storage subsystem 100 since the data received from the host processors 11-12 is mapped from its address in the virtual space to a physical location in the subsystem in a dynamic fashion. A virtual track directory is maintained to recall the location of the current instance of each virtual track in the disk drive array data storage subsystem 100. The virtual track directory consists of an entry for each virtual track which the associated host processor 11 can address. The entry usually contains the logical sector address at which the virtual track instance begins. The virtual track directory entry also contains data indicative of the length of the virtual track instance in sectors. The virtual track directory is stored in noncontiguous pieces of the cache memory 113 and is addressed indirectly through pointers in a virtual device table. The virtual track directory is updated whenever a new virtual track instance is written to the disk drives.

Virtual Track Directory

Figure 3:
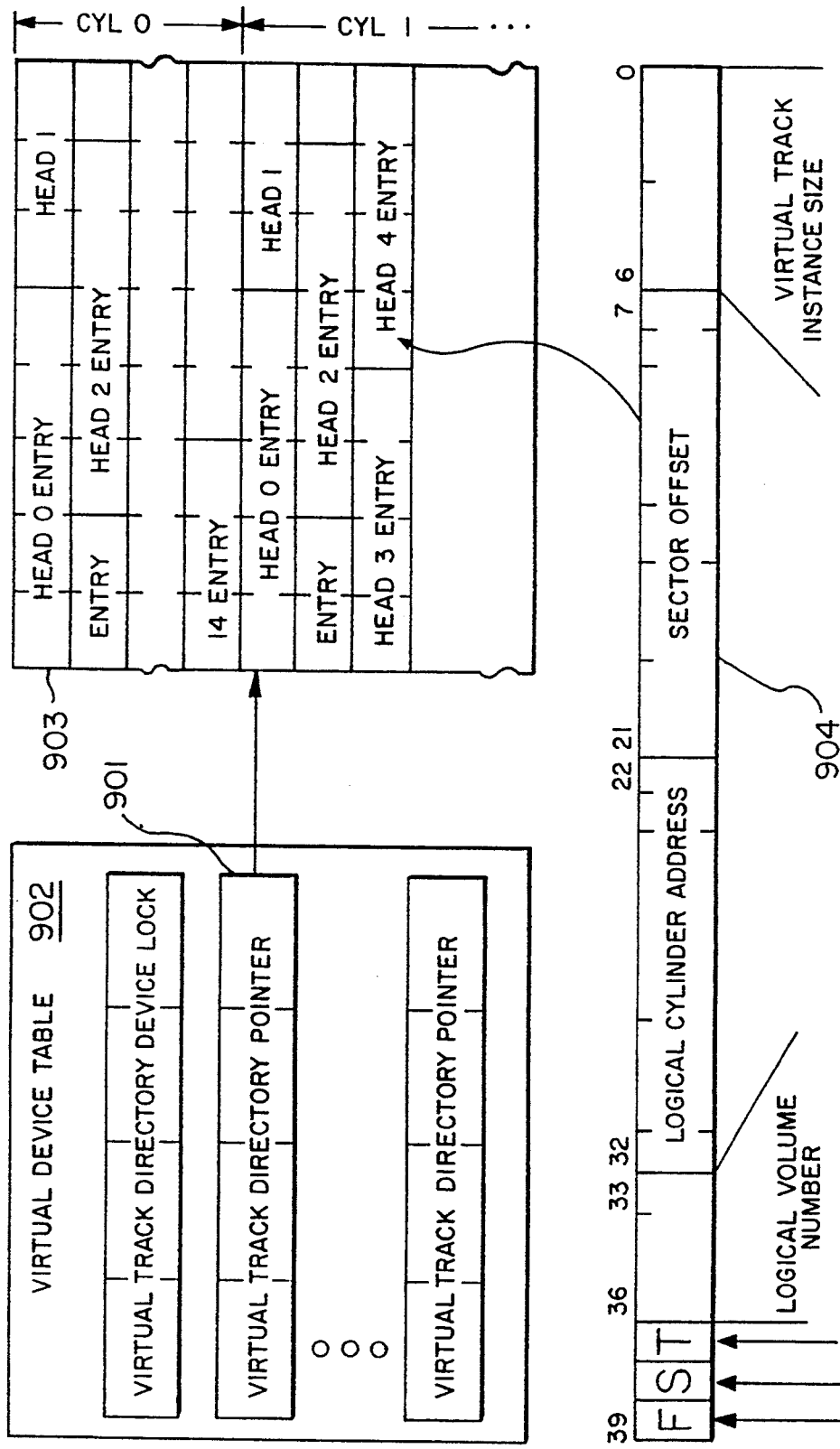
FIG. 3 illustrates the format of the virtual track directory.

FIG. 3 illustrates the format of the virtual track directory 900 that is contained within cache memory 113. The virtual track directory 900 consists of the tables that map the virtual addresses as presented by host processor 11 to the logical drive addresses that is used by control unit 101. There is another mapping that takes place within control unit 101 and this is the logical to physical mapping to translate the logical address defined by the virtual track directory 900 into the exact physical location of the particular disk drive that contains data identified by the host processor 11. The virtual track directory 900 is made up of two parts: the virtual track directory pointers 901 in the virtual device table 902 and the virtual track directory 903 itself. The virtual track directory 903 is not contiguous in cache memory 113 but is scattered about the physical extent of cache memory 113 in predefined segments (such as 903-1). Each segment 903-1 has a virtual to logical mapping for a predetermined number of cylinders, for example 102 cylinders worth of IBM 3390-3 type DASD tracks. In the virtual device table 902, there are pointers to as many of these segments 903 as needed to emulate the number of cylinders configured for each of the virtual devices defined by host processor 11. The virtual track directory 900 is created by control unit 101 at the virtual device configuration time. When a virtual volume is configured, the number of cylinders in that volume is defined by the host processor 11. A segment 903-1 or a plurality of segments of volatile cache memory 113 are allocated to this virtual volume defined by host processor 11 and the virtual device table 902 is updated with the pointers to identify these segments 903 contained within cache memory 113. Each segment 903 is initialized with no pointers to indicate that the virtual tracks contained on this virtual volume have not yet been written. Each entry 905 in the virtual device table is for a single virtual track and is addressed by the virtual track address. As shown in FIG. 3, each entry 905 is 40 bits long. If the Format Flag is clear the entry 905 contents are as follows starting with the high order bits:

| Bit 39: | Format Flag: When set this flag indicates that this entry contains format information. |
|---|---|
| Bit 38: | Source Flag. |
| Bit 37: | Target Flag. |
| Bits 36–33: | Logical volume number. |
| Bits 32–22: | Logical cylinder address. This data entry is identical to the physical cylinder number. |
| Bits 21–7: | Sector offset. This entry is the offset to the start of the virtual track instance in the logical cylinder, not including the redundancy track sectors. These sectors typically contained 512 bytes. |
| Bits 6–0: | Virtual track instance size. This entry notes the number of sectors that are required to store this virtual track instance. |

If the Format Flag is set, then the Virtual Track Directory Entry contains format information as follows:

| Bit 39: | Format Flag |
|---|---|
| Bits 38–32: | Number of Records per Track |
| Bits 31–24: | Encoded Data Record Size |
| Bits 23–16: | Key Field Length |
| Bits 15–0: | Relative Cylinder Address |

Data Read Operation

Figure 6:
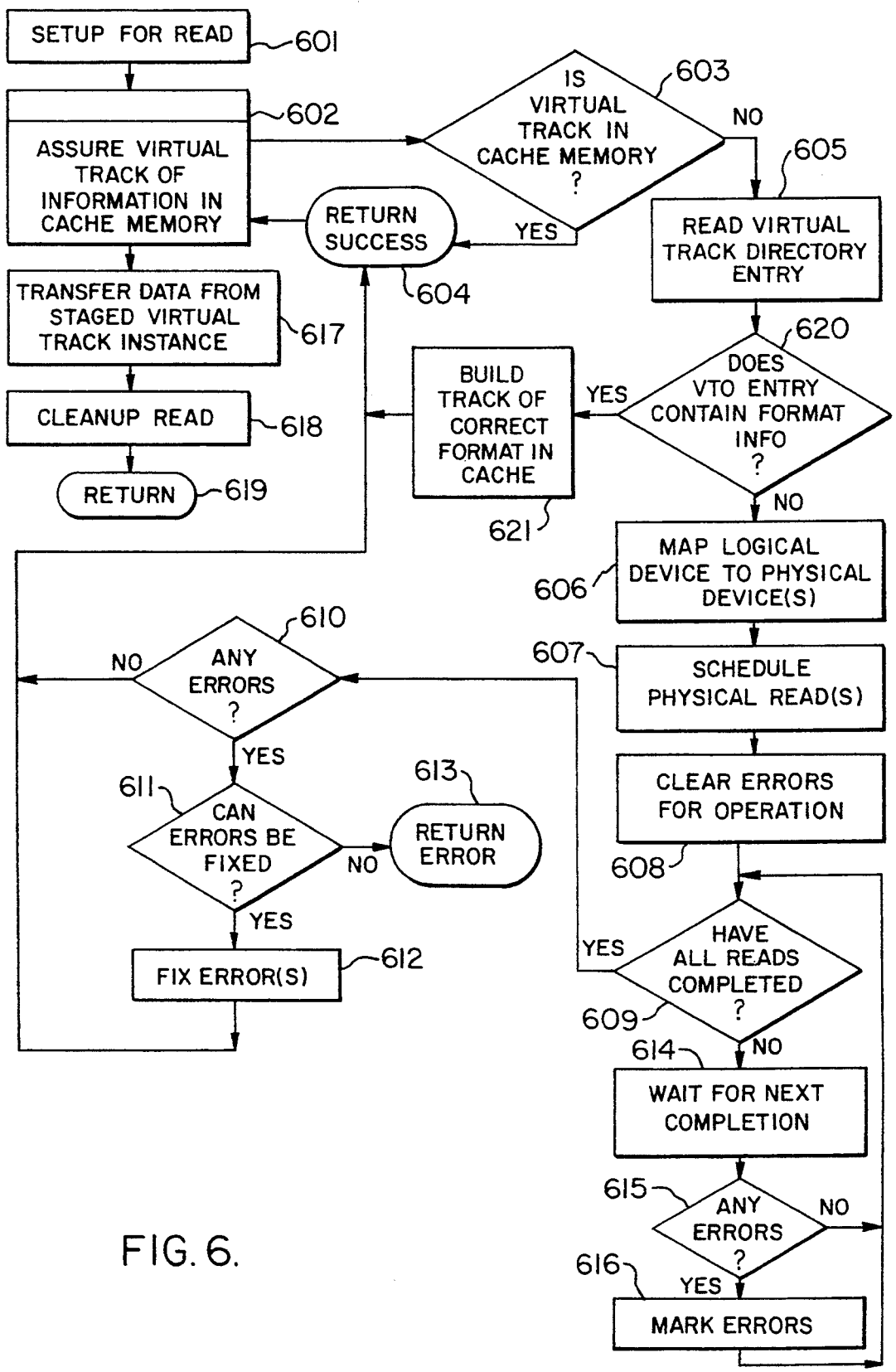
FIGS. 6 and 7 illustrate, in flow diagram form, the operational steps taken to perform a data read and write operation, respectively.

FIG. 6 illustrates in flow diagram form the operational steps taken by processor 204 in control unit 101 of the data storage subsystem 100 to read data from a data redundancy group 122-1 to 122-n+m in the disk drive subsets 103. The disk drive array data storage subsystem 100 supports reads of any size. However, the logical layer only supports reads of virtual track instances. In order to perform a read operation, the virtual track instance that contains the data to be read is staged from the logical layer into the cache memory 113. The data record is then transferred from the cache memory 113 and any clean up is performed to complete the read operation.

At step 601, the control unit 101 prepares to read a record from a virtual track. At step 602, the control unit 101 branches to the cache directory search subroutine to assure that the virtual track is located in the cache memory 113 since the virtual track may already have been staged into the cache memory 113 and stored therein in addition to having a copy stored on the plurality of disk drives (122-1 to 122-n+m) that constitute the redundancy group in which the virtual track is stored. At step 603, the control unit 101 scans the hash table directory of the cache memory 113 to determine whether the requested virtual track is located in the cache memory 113. If it is, at step 604 control returns back to the main read operation routine and the cache staging subroutine that constitutes steps 605–616 and 620–621 is terminated.

Assume, for the purpose of this description, that the virtual track that has been requested is not located in the cache memory 113. Processing proceeds to step 605 where the control unit 101 reads the Virtual Track Directory (VTD) Entry and processing proceeds to step 620. If this is a normal read, the VTD Entry contains the Logical Address of the data, that is the location of the Virtual Track in the disk arrays. However, if this is a stage in preparation for a write, the VTD Entry may contain format information only. If the Format Flag in the VTD Entry is set, processing proceeds to step 621. At step 621, space is allocated in cache memory 113 for the virtual track. That space in cache memory is formatted using the format information read from the VTD Entry. Then processing returns back to the main routine at step 604 where the formatted track in cache is ready to receive host records. If at step 620 the Format Flag in the VTD Entry is clear, then the VTD Entry contains the Logical Address of the Virtual Track and processing proceeds to step 606. At step 606, the logical map location is used to map the logical device to one or more physical devices in the redundancy group. At step 607, the control unit 101 schedules one or more physical read operations to retrieve the virtual track instance from appropriate ones of identified physical devices 122-1 to 122-n+m. At step 608, the control unit 101 clears errors for these operations. At step 609, a determination is made whether all the reads have been completed, since the requested virtual track instance may be stored on more than one of the N+M disk drives in a redundancy group. If all of the reads have not been completed, processing proceeds to step 614 where the control unit 101 waits for the next completion of a read operation by one of the N+M disk drives in the redundancy group. At step 615 the next reading disk drive has completed its operation and a determination is made whether there are any errors in the read operation that has just been completed. If there are errors, at step 616 the errors are marked and control proceeds back to the beginning of step 609 where a determination is made whether all the reads have been completed. If at this point all the reads have been completed and all portions of the virtual track instance have been retrieved from the redundancy group, then processing proceeds to step 610 where a determination is made whether there are any errors in the reads that have been completed. If errors are detected then at step 611 a determination is made whether the errors can be fixed. One error correction method is the use of a Reed-Solomon error detection/correction code to recreate the data that cannot be read directly. If the errors cannot be repaired then a flag is set to indicate to the control unit 101 that the virtual track instance can not be read accurately. If the errors can be fixed, then in step 612 the identified errors are corrected and processing returns back to the main routine at step 604 where a successful read of the virtual track instance from the redundancy group to the cache memory 113 has been completed.

At step 617, control unit 101 transfers the requested data record from the staged virtual track instance in which it is presently stored. Once the records of interest from the staged virtual track have been transferred to the host processor 11 that requested this information, then at step 618 the control unit 101 cleans up the read operation by performing the administrative tasks necessary to place all of the apparatus required to stage the virtual track instance from the redundancy group to the cache memory 113 into an idle state and control returns at step 619 to service the next operation that is requested.

Data Write Operation

Figure 7:
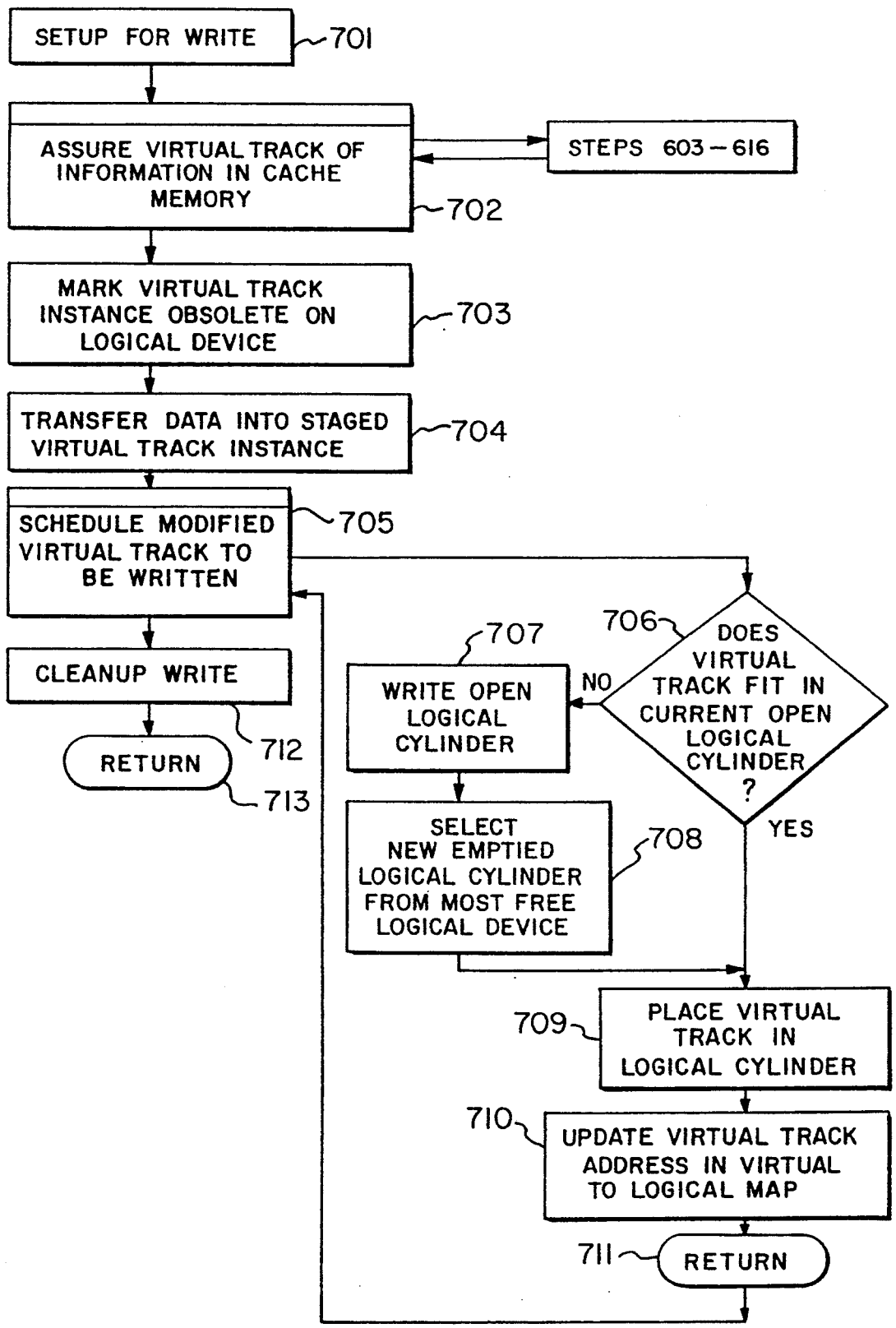

FIG. 7 illustrates in flow diagram form the operational steps taken by the disk drive array data storage subsystem 100 to perform a data write operation. The disk drive array data storage subsystem 100 supports writes of any size, but again, the logical layer only supports writes of virtual track instances. Therefore in order to perform a write operation, the virtual track that contains the data record to be rewritten is staged from the logical layer into the cache memory 113. Once the write operation is complete, the location of the obsolete instance of the virtual track is marked as free space. The modified data record is then transferred into the virtual track and this updated virtual track instance is then scheduled to be written from the cache memory 113 where the data record modification has taken place into the logical layer. Any clean up of the write operation is then performed once this transfer and write is completed.

Figure 5:
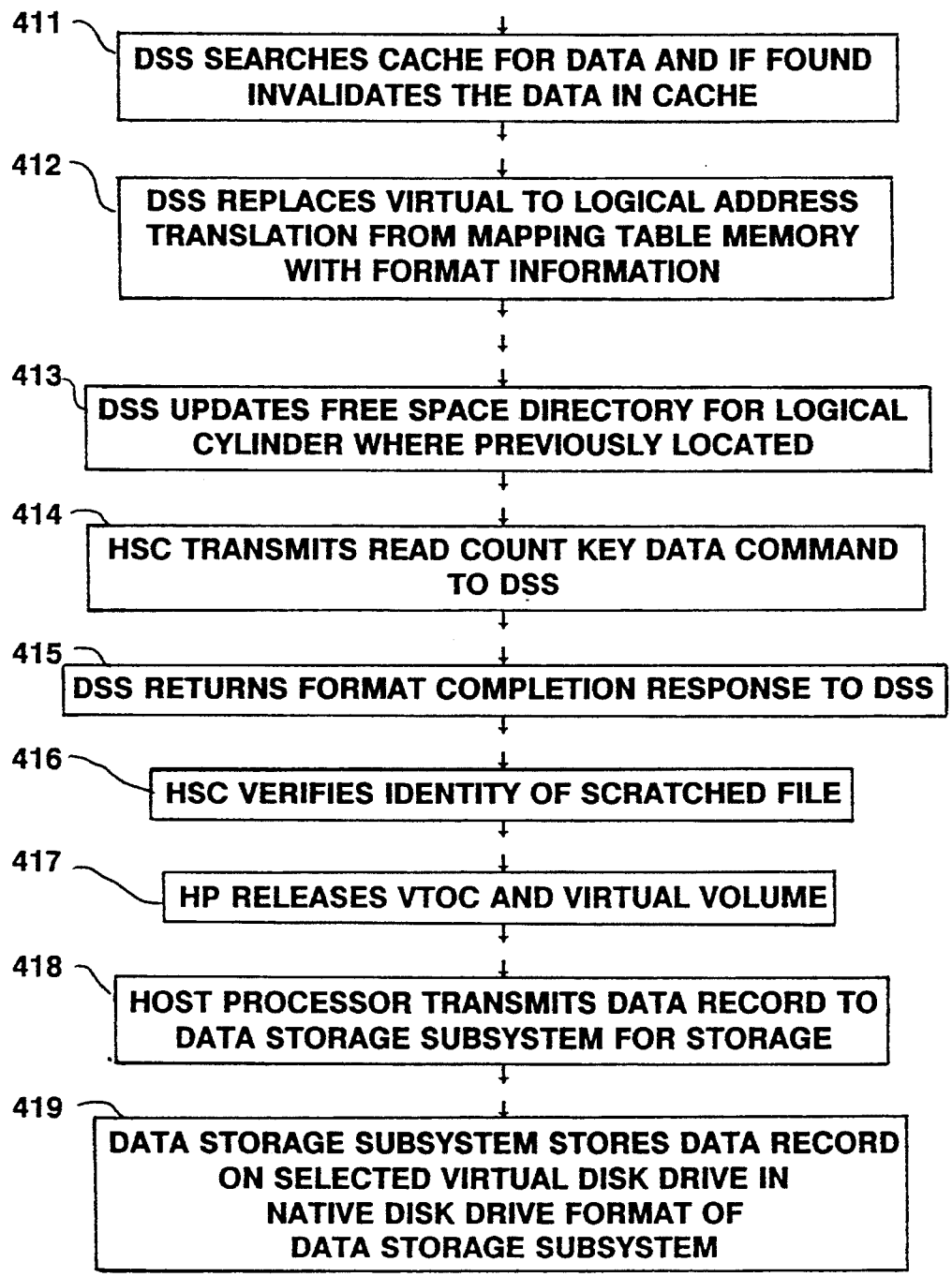

At step 701, the control unit 101 performs the set up for a write operation and at step 702, as with the read operation described above, the control unit 101 branches to the cache directory search subroutine to assure that the virtual track into which the data is to be transferred is located in the cache memory 113. Since all of the data updating is performed in the cache memory 113, the virtual track in which this data is to be written must be transferred from the redundancy group in which it is stored to the cache memory 113 if it is not already resident in the cache memory 113. The transfer of the requested virtual track instance to the cache memory 113 is performed for a write operation as it is described above with respect to a data read operation and constitutes steps 603–616 and 620–621 illustrated in FIG. 5 above.

At step 703, the control unit 101 marks the virtual track instance that is stored in the redundancy group as invalid in order to assure that the logical location at which this virtual track instance is stored is not accessed in response to another host processor 12 attempting to read or write the same virtual track. Since the modified record data is to be written into this virtual track in the cache memory 113, the copy of the virtual track that resides in the redundancy group is now inaccurate and must be removed from access by the host processors 11–12. At step 704, the control unit 101 transfers the modified record data received from host processor 11 into the virtual track that has been retrieved from the redundancy group into the cache memory 113 to thereby merge this modified record data into the original virtual track instance that was retrieved from the redundancy group. Once this merge has been completed and the virtual track now is updated with the modified record data received from host processor 11, the control unit 101 must schedule this updated virtual track instance to be written onto a redundancy group somewhere in the disk drive array data storage subsystem 100.

This scheduling is accomplished by the subroutine that consists of steps 706–711. At step 706, the control unit 101 determines whether the virtual track instance as updated fits into an available open logical cylinder. If it does not fit into an available open logical cylinder, then at step 707 then this presently open logical cylinder must be closed out and written to the physical layer and another logical cylinder selected from the most free logical device or redundancy group in the disk drive array data storage subsystem 100. At step 708, the selection of a free logical cylinder from the most free logical device takes place. This ensures that the data files received from host processor 11 are distributed across the plurality of redundancy groups in the disk drive array data storage subsystem 100 in an even manner to avoid overloading certain redundancy groups while underloading other redundancy groups. Once a free logical cylinder is available, either being the presently open logical cylinder or a newly selected logical cylinder, then at step 709, the control unit 101 writes the updated virtual track instance as well as the disk formatting data associated with this virtual track instance into the logical cylinder and at step 710 the new location of the virtual track is placed in the virtual track directory in order to render it available to the host processors 11–12. At step 711, control returns to the main routine, where at step 712 the control unit 101 cleans up the remaining administrative tasks to complete the write operation and return to an available state at 712 for further read or write operations from host processor 11.

Description of Disk Format Operation

Figure 4:
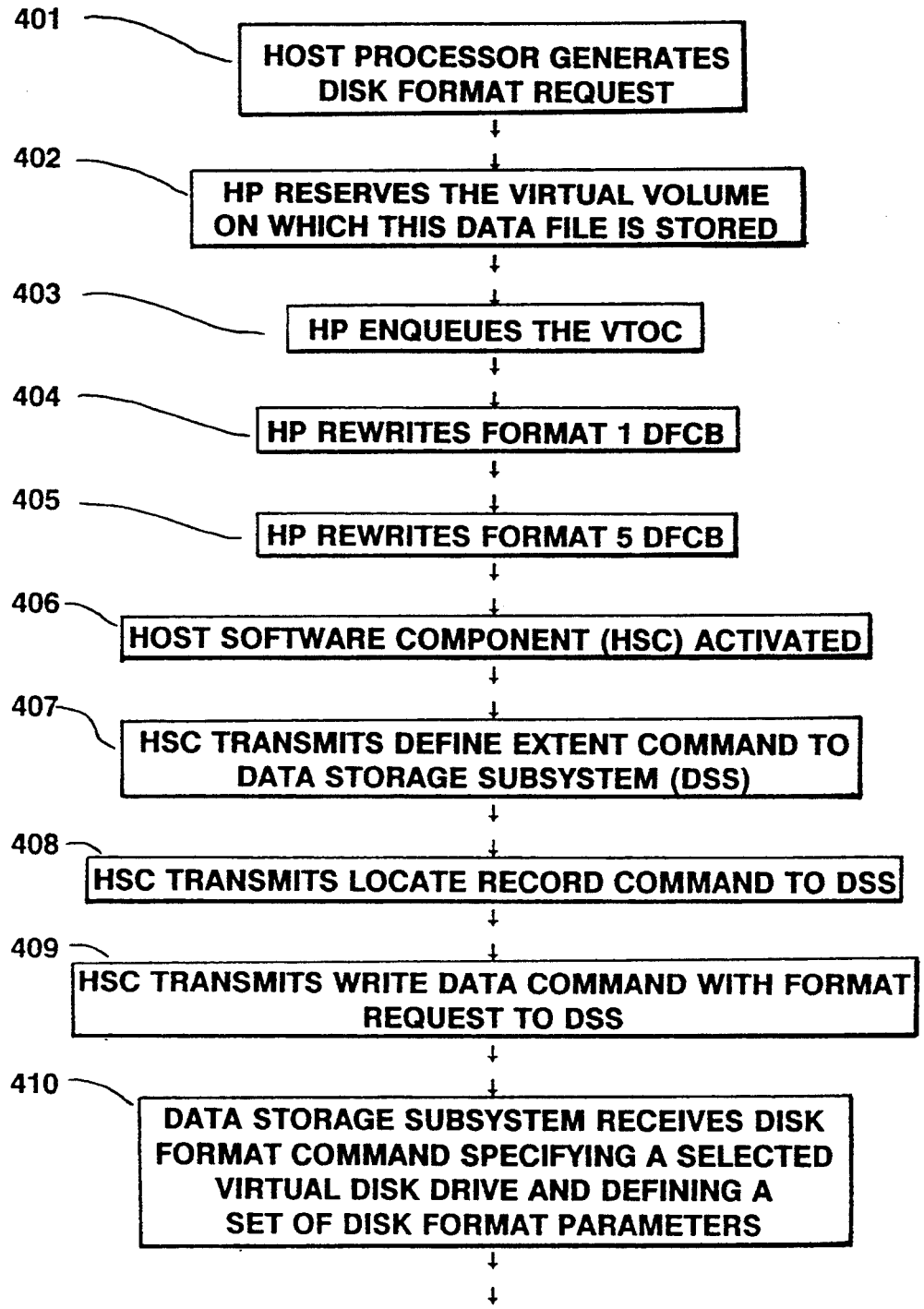
FIGS. 4 and 5 illustrate, in flow diagram form, the operational steps taken to perform a disk format operation.

The DISK FORMAT operation (FIGS. 4 and 5) is initiated in host processor 11 at step 401 by the activation of the DISK FORMAT channel program. This routine enables host processor 11 to format a specific virtual volume in data storage subsystem 100 in a particular host processor defined format. A disk format operation requires that all data files previously contained in the virtual volume being reformatted first be deleted from the virtual volume. In addition, if the tracks containing these data files are also written into cache memory 113, they must also be deleted from cache memory 113.

In operation, the host processor 11, reserves the virtual volume to be formatted at step 402. The virtual volume is reserved by host processor 11 in order to protect against other host processors 12 attempting to access the selected virtual volume on the data storage subsystem 100 while the first host processor 11 is attempting to format this virtual volume. The host processor 11 then enqueues the volume table of contents (VTOC) at step 403, which is a process that protects against other application programs or software components within the same host processor 11 from accessing the selected virtual volume. The host processor 11 then rewrites the virtual volume control block which defines the identified virtual volume from a format 1 mode which indicates that data is contained therein to a format 0 mode which indicates an empty data file at step 404. In addition, the host processor 11 rewrites the format 5 data file control block which defines unallocated space on the virtual volume at step 405. By rewriting the format 5 data file control block, the host processor 11 adds this sequence of physical extents previously occupied by the scratched data files in this virtual volume to the list of free space in the virtual volume. At this point, a host software component 11A, which is part of data storage subsystem 100, is activated at step 406. This host software component 11A consists of a standard user exit call, well known in the MVS software environment, which is implemented at the conclusion of the format 5 data file control block rewrite process. This host software component 11A transmits a channel program to the data storage subsystem 100 and, in response thereto, receives a response indicating that the selected data files have been formatted in the selected virtual volume in data storage subsystem 100. This message exchange is accomplished by using the existing subset of channel control words well known in the MVS environment. These channel control words include the "define extent", "locate record", "write data", and "read CKD" commands. Each of these channel command words consist of pointers that point to associated parameter lists or data stored in the memory of the host processor 11.

FIG. 8 illustrates the channel program commands and data exchanged between the host software component 11A on host processor 11 and data storage subsystem 100. At step 407, host software component 11A transmits a Define Extent command 1301, whose associated parameters 1311 include seek addresses (CCHH) xxxxxxxx and yyyyyyyy which define the extents (virtual DASD tracks) to be formatted. At step 408, host software component 11A transmits a Locate Record command 1302 whose associated parameters 1312 represent a non-authorized command. This standard Locate Record command parameters are altered by host software component 11A to render them uniquely identifiable by data storage subsystem 100 as a non-host processor message. In particular, there is an intentional contradiction created between bit 0 of byte 1 (auxiliary byte) and bytes 14, 15 (the transfer length factor). In addition, the search argument of bytes 8-11 is set to a predetermined pattern—C5C3C1D4. These two concurrent alterations in the Locate Record parameters alert data storage subsystem 100 of the host software component 11A source of these commands. In addition, byte 12 includes a function code indicative of the operation requested by host software component 11A. A seek address zzzzzzzz is included in parameters 1312 at bytes 4 - 7, which seek address is within the extents defined in the Define Extents parameters 1311. At step 409, host software component transmits a Write Data command 1303 whose associated parameters 1313 include definitions of the desired disk format. In response to the receipt at step 410 of these channel commands and parameters, data storage subsystem 100 at step 311 searches cache 113 for the identified data files and, if found, invalidates these data files in cache 113 to prevent subsequent access to them, since they are now invalid. Data storage subsystem 100 at step 412 replaces the data file's virtual address to logical address translation information from mapping table memory 401 with data indicative of the format information received in the parameters of the Write Data command. Data storage subsystem 100 also sets the Format Flag in the VTD Entry to indicate that the entry contains format information. This operation renders the extent defined in the Define Extent parameters 1311 free space in data storage subsystem 100o Then, at step 413 data storage subsystem 100 updates the Free Space Directory for the logical cylinder that previously contained the data. At step 414, the host software component causes a Read Count Key and Data channel command 1304 to be transmitted to data storage subsystem 100, which replies at step 415 with message 1314 which lists the virtual volume extent reformatted (beginning CCHH and ending CCHH) as well as the seek address from the Locate Record parameters 1312 transmitted by the host software component 11A. At step 416 host software component 11A verifies the reformatted virtual volume by comparing the data returned by data storage subsystem in the Read Count Key Data parameters 1314 with the data originally transmitted by host software component 11A. Host processor 11 at step 417 releases the volume table of contents that was enqueued at step 403 and the virtual volume that was reserved at step 402. The format process ends if a successful comparison is achieved and host processor 11 is released to continue operation.

As host processor 11 later transmits data records to data storage subsystem 100 for storage therein (step 418) on the selected reformatted virtual volume (ex-disk drives 122*), control unit 101 at step 419 stores the received data records along with the format information in the native format of disk drives (122-1 to 122-n+m) rather than the specified format of virtual disk drive 122*.

While a specific embodiment of this invention has been disclosed herein, it is expected that those skilled in the art can design other embodiments that differ from this particular embodiment but fall within the scope of the appended claims.

We claim:

1. A disk memory system for storing data records for at least one associated data processor comprising:
   a plurality of disk drives formatted in a native disk format to store data records, a subset of said plurality of disk drives being configured into at least two redundancy groups, each redundancy group consisting of at least two disk drives;
   means, responsive to a receipt of disk formatting data from said associated data processor, for storing said disk formatting data in a cache memory which is part of said disk memory system; p1 means, responsive to a receipt of a stream of data records, formatted as defined by said stored formatting data, from said associated data processor, for selecting available memory space in one of said redundancy groups to store said received stream of data records thereon; and
   means for writing said received stream of data records, redundancy data associated with said received stream of data records and said stored formatting data in said selected available memory space in said selected redundancy group in said native disk format.

2. The system of claim 1 further comprising:
   means, responsive to the subsequent receipt, from said associated data processor, of a request to read a selected data record from said disk memory system for retrieving said requested data record from memory space in one of said redundancy groups in which said requested data record was previously stored;
   means for retrieving said stored disk formatting data from said memory space;
   means for formatting said requested data record as defined by said retrieved disk formatting data; and
   means for transmitting said formatted data record to said associated data processor.

3. The system of claim 2 further comprising:
means for maintaining data indicative of the correspondence between each said received stream of data records and the identity of the one of said at least two disk drives in said selected redundancy group on which said received stream of data records is stored.

4. The system of claim 3 further comprising:
means for maintaining data indicative of the correspondence between each said received stream of data records and the identity of said formatting data stored in said memory space and that corresponds to said received stream of data records.

5. The system of claim 1 further comprising:
means for maintaining data indicative of the correspondence between each said received stream of data records and the identity of said tracks on said at least two disk drives in said selected redundancy group on which said received stream of data records is stored.

6. In a disk memory system having a plurality of disk drives formatted in a native disk format to store data records, a subset of said plurality of disk drives being configured into at least two redundancy groups, each redundancy group consisting of at least two disk drives, a method for storing data records for at least one associated data processor comprising the steps of:
storing, in response to a receipt from said associated data processor, of disk formatting data, said disk formatting data in a cache memory which is part of said disk memory system;
selecting, in response to a receipt of a stream of data records formatted as defined by said stored formatting data, from said associated data processor, available memory space in one of said redundancy groups to store said received stream of data records thereon; and
writing said received stream of data records, redundancy data associated with said received stream of data records, and said disk formatting data in said selected available memory space in said selected redundancy group in said native disk format.

7. The method of claim 6 further comprising the steps of:
retrieving, in response to the subsequent receipt from said associated data processor, of a request to read a selected data record from said disk memory system, said requested data record from memory space in one of said redundancy groups in which said requested data record was previously stored;
retrieving said stored disk formatting data from said memory space;
means for formatting said requested data record as defined by said retrieved disk formatting data; and
transmitting said formatted data record to said associated data processor.

8. The method of claim 7 further comprising the step of:
maintaining data indicative of the correspondence between each said received stream of data records and the identity of the one of said at least two disk drives in said selected redundancy group on which said received stream of data records is stored.

9. The method of claim 8 further comprising the step of:
maintaining data indicative of the correspondence between each said received stream of data records and the identity of said disk formatting data stored in said memory space that corresponds to said received stream of data records.

10. The method of claim 6 further comprising the step of:
maintaining data indicative of the correspondence between each said received stream of data records and the identity of said tracks on said at least two disk drives in said selected redundancy group on which said received stream of data records is stored.

11. A disk memory system for storing data records for at least one associated data processor comprising:
a plurality of disk drives formatted in a native disk format to store data records, a number of said plurality of said disk drives configured into at least two redundancy groups, each redundancy group consisting of n+m disk drives, where n and m are both positive integers with n being greater than 1 and m being equal to or greater than 1;
means, responsive to a receipt of disk formatting data from said associated data processor, for storing said disk formatting data in a cache memory which is part of said disk memory system;
means responsive to a receipt from said associated data processor of a stream of data records, formatted as defined by said stored disk formatting data, for storing said received stream of data records;
means for generating m redundancy segments using said n received streams of data records; and
means for writing said received stream of data records, said m redundancy segments and said stored formatting data in a selected one of said redundancy groups, on said n+m disk drives in said selected redundancy group in native disk format.

12. The system of claim 11 further comprising:
means, responsive to a subsequent receipt from said associated data processor, of a request to read a selected data record for retrieving said requested data record from memory space in one of said redundancy groups in which said requested data record was previously stored;
means, for retrieving said stored disk formatting data from said memory space;
means for formatting said requested data record as defined by said retrieved disk formatting data; and
means for transmitting said formatted data record to said associated data processor.

13. The system of claim 12 further comprising:
means for maintaining data indicative of the correspondence between each said received stream of data records and the identity of the one of said at least two disk drives in said selected redundancy group on which said received stream of data records is stored.

14. The system of claim 13 further comprising:
means for maintaining data indicative of the correspondence between each said received stream of data records and the identity of said formatting data stored in said memory space that corresponds to said data record format.

15. The system of claim 11 further comprising:
means for maintaining data indicative of the correspondence between each said received stream of data records and the identity of said tracks on said at least two disk drives in said selected redundancy group on which said received stream of data records is stored.

16. In a disk memory system having a plurality of disk drives formatted in a native disk format to store data records, a number of said plurality of said disk drives configured into at least two redundancy groups, each redundancy group consisting of n+m disk drives, where n and m are both positive integers with n being greater than 1 and m being equal to or greater than 1, a method for storing data records for at least one associated data processor comprising the steps of:

storing, in response to a receipt from said associated data processor, of disk formatting data said disk formatting data in a cache memory which is part of said disk memory system;

storing, in response to a receipt from said associated data processor, of a stream of data records, formatted as defined by said stored disk formatting data, said received stream of data records;

generating m redundancy segments using said n received streams of data records; and writing said received stream of data records, said m redundancy segments, and said stored disk formatting data in a selected one of said redundancy groups, on said n+m disk drives in said selected redundancy group in said selected format.

17. The method of claim 16 further comprising the steps of:

retrieving, in response to the subsequent receipt from said associated processor, of a request to read a selected data record said requested data record from memory space in one of said redundancy groups in which said requested data record was previously stored;

retrieving said stored disk formatting data from said memory space;

means for formatting said requested data record as defined by said stored disk formatting data; and transmitting said formatted data record to said associated data processor.

18. The method of claim 17 further comprising the step of:

maintaining data indicative of the correspondence between each said received stream of data records and the identity of the one of said at least two disk drives in said selected redundancy group on which said received stream of data records is stored.

19. The method of claim 18 further comprising the step of:

maintaining data indicative of the correspondence between each said received stream of data records and the identity of said disk formatting data stored in said memory that corresponds to said data record format.

20. The method of claim 16 further comprising the step of:

maintaining data indicative of the correspondence between each said received stream of data records and the identity of said tracks on said at least two disk drives in said selected redundancy group on which said received stream of data records is stored.

* * * * *